(12) United States Patent
Alfke

(10) Patent No.: US 6,260,139 B1
(45) Date of Patent: Jul. 10, 2001

(54) FPGA CONTROL STRUCTURE FOR SELF-RECONFIGURATION

(75) Inventor: Peter H. Alfke, Los Altos Hills, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/237,576

(22) Filed: Jan. 26, 1999

(51) Int. Cl.[7] .............................. G06F 9/00; G06F 15/177
(52) U.S. Cl. ................................................. 713/1; 713/100
(58) Field of Search ...................... 713/1, 2, 100

(56) References Cited

U.S. PATENT DOCUMENTS

| | | | |
|---|---|---|---|
| 5,336,950 | * 8/1994 | Popli et al. | 326/39 |
| 5,784,636 | * 7/1998 | Rupp | 712/37 |
| 5,995,744 | * 11/1999 | Guccione | 395/500.44 |
| 6,038,400 | * 3/2000 | Bell et al. | 395/831 |
| 6,157,210 | * 12/2000 | Zaveri et al. | 326/40 |

OTHER PUBLICATIONS

Peter H. Alfke, "An FPGA Can Control Its Own Reconfiguration", XCELL, The Quarterly Journal for Xilinix Programmable Logic Users, Issue 27, published Feb. 13, 1998.

* cited by examiner

Primary Examiner—Dennis M. Butler
(74) Attorney, Agent, or Firm—Adam H. Tachner; Lois D. Cartier

(57) ABSTRACT

The invention provides a Field Programmable Gate Array (FPGA) that initiates its own reconfiguration by driving its own output terminal and its own connected PROGRAM input terminal, permitting reliable self-reconfiguration of the FPGA. The signal forwarded to the PROGRAM input terminal triggers a reconfiguration sequence that, in turn, causes the signal received from the output terminal to be ignored. Therefore, the method of the invention is reliably stable and does not undesirably repeat, oscillate, or fail. The FPGA may initiate its own reconfiguration upon detecting that a new configuration bitstream has been selected for downloading from an external device such as a PROM. The FPGA may detect the actuation of a binary or rotary switch. Alternatively, the FPGA may detect when a CMOS latch or register points to a new configuration address in the PROM. In one embodiment, an external memory device stores FPGA state information from one reconfiguration cycle to the next.

32 Claims, 3 Drawing Sheets

FPGA CONTROL STRUCTURE FOR SELF-RECONFIGURATION

FIELD OF THE INVENTION

The present invention is related generally to the self-reconfiguration of programmable devices, and more specifically to the self-reconfiguration of Field Programmable Gate Arrays (FPGAs).

BACKGROUND OF THE INVENTION

Programmable logic devices such as FPGAs have wide applicability due to their flexibility and reprogrammability. An FPGA typically includes an array of configurable logic blocks (CLBs) programmably interconnected to one another across a configurable routing structure to implement a user's desired logic functions and circuit design. FPGAs also include a number of configuration memory cells coupled to the CLBs to specify the function to be performed by each CLB, and a number of configuration memory cells coupled to the configurable routing structure to specify the connectivity between CLBs. FPGAs may also include data storage cells accessible by a user during device operation.

FPGAs are most commonly used within systems including a microprocessor or similar control device and a memory unit. Referring to FIG. 1, an available FPGA 120 receives a configuration bitstream from memory device 100 upon receipt of a PROGRAM signal from microprocessor 110, causing the FPGA to erase its now-unwanted configuration data and prepare to receive new configuration data from memory 100. Thus, while reconfiguring an FPGA within a controlled system to perform different logic functions at different times is known in the art, conventional reconfiguration techniques require fairly sophisticated and expensive control devices, such as microprocessor 110, to instigate reconfiguration as needed for a particular system. There remains, therefore, a need in the art for a system capable of reconfiguring an FPGA without a sophisticated control device.

SUMMARY OF THE INVENTION

To address the shortcomings of the available art, the present invention provides a system, including a reprogrammable device, which initiates its own reconfiguration by driving an output signal onto the device's own configuration-initiating input terminal. Built-in delays and sequences in a preferred FPGA architecture permit reliable operation of the inventive system, since the received reconfiguration signal triggers a configuration sequence that, in turn, stops the output signal from continuing to drive the input terminal. The FPGA preferably initiates its own reconfiguration upon detecting that a new configuration (i.e., new configuration data for all or part of the FPGA) has been designated by a simple external control device. The FPGA then downloads the configuration from an external memory device. For example, the FPGA may detect the actuation of a binary or rotary switch. In another embodiment, the FPGA detects when a CMOS latch or a register points to a new address in the external memory device in which the configuration data is stored.

It is therefore a first advantage of the present invention to provide a self-reprogrammable system, the system including a monitoring circuit for detecting a monitored characteristic of an external signal, the monitoring circuit including means for generating a reconfiguration request signal in response to detection of a change in the monitored characteristic of the external signal, the system having an input terminal and an output terminal in electrical communication with the input terminal, the system being responsive to the reconfiguration request signal such that the system drives a signal on the output terminal into a first state and enters a reconfiguration mode in response to detection of the first state on the input terminal.

Another advantage of the present invention is the provision of a method of self-reconfiguration of a programmable device, the method including the steps of monitoring an external signal, determining whether there is a difference between a detected characteristic of the external signal at a first and second time, driving a signal on an output terminal of the programmable device into a first state in response to a determination that there is a difference between the detected characteristic at the first and the second time, detecting the first state of a signal on the output terminal at an input terminal of the programmable device, and causing the programmable device to enter a reconfiguration mode in response to detection of the first state.

A further advantage of the present invention is the provision of a system for causing self-reconfiguration in a programmable device, the system including means for monitoring an external signal, means for determining whether there is a difference between a detected characteristic of the external signal at a first and a second time, means for driving a signal on an output terminal of the programmable device into a first state in response to a determination that there is a difference between the detected characteristic at the first and the second time, means for detecting the first state of the signal on the output terminal at an input terminal of the programmable device, and means for causing the programmable device to enter a reconfiguration mode in response to detection of the first state.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

Figure 1:
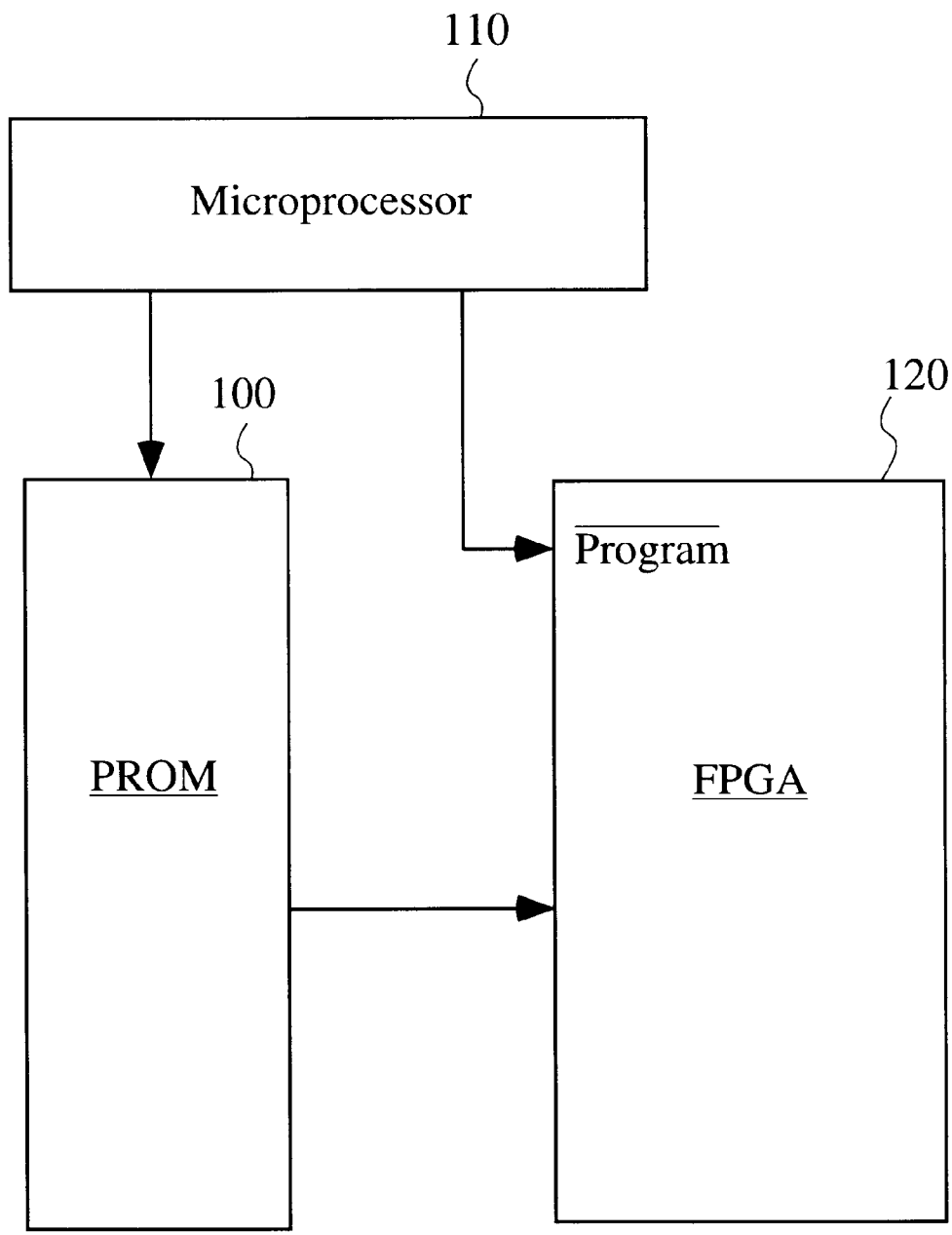
FIG. 1 is a diagrammatic view illustrating an available system including a reconfigurable FPGA.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE DRAWINGS

Figure 2:
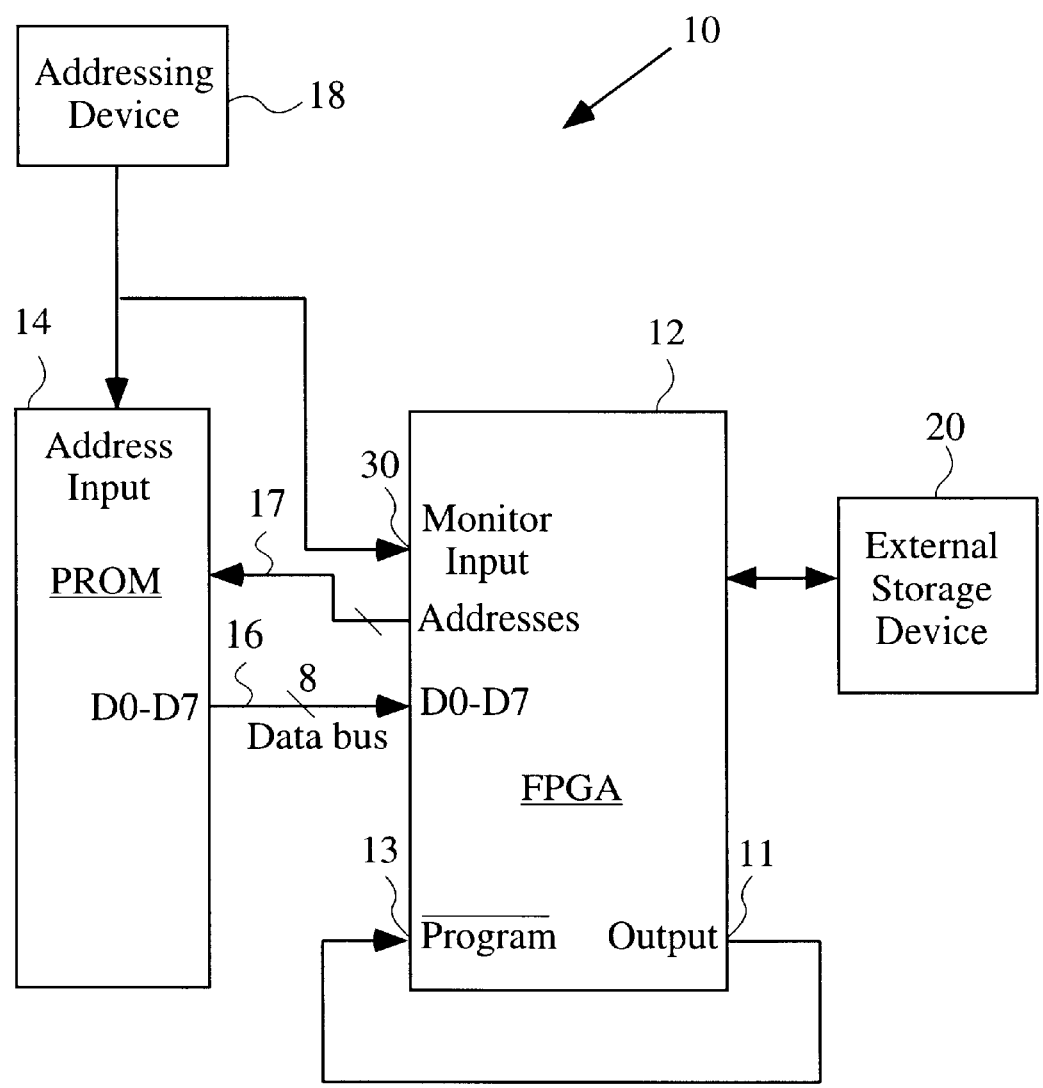
FIG. 2 is a diagrammatic view illustrating an embodiment of the present invention including a system for facilitating self-reconfiguration of an FPGA.

Referring to FIG. 2, a system 10 for facilitating self-reconfiguration of an FPGA 12 is illustrated. FPGA 12 may be, for example, an available reprogrammable device such as the Virtex™ series and XC4000™ series of devices available from Xilinx, Inc. in San Jose, Calif., assignee of the present invention. System 10 includes an electrical connection between FPGA output terminal 11 and FPGA PROGRAM input terminal 13. External configuration Programmable Read Only Memory ("PROM") 14 is coupled to FPGA 12 via a databus 16. PROM 14 may be a parallel PROM, as shown, or any other quickly-accessible, long-term stable memory device or combination of devices, as understood by those skilled in the art of data access and storage. PROM 14 stores a plurality of configurations (e.g., in the form of programs, data files, or bit streams) for configuring FPGA 12.

When PROM 14 is a parallel PROM, as in FIG. 2, FPGA 12 provides addresses to the PROM via address bus 17 that are used to step incrementally through the selected configuration. Such circuitry is already included on some FPGAS. For example, incremental addresses are currently provided by XC4000 Series FPGAs when in Master Configuration modes.

A simple addressing device 18 is also coupled to FPGA 12 and PROM 14. Addressing device 18 points to the location of or otherwise indicates the need for a configuration stored within PROM 14 and actuates FPGA 12 through an "eavesdropping" connection to monitoring input 30. In one embodiment, addressing device 18 simply selects between two or more configurations stored in PROM 14. Thus, the PROM is addressed by a combination of signals from two sources: addressing device 18 (providing, in a sense, the most significant bits of the address) and FPGA 12 (providing incremental addressing within the configuration selected by addressing device 18). Addressing device 18 may take any compatible form, such as a binary or rotary switch that can be actuated automatically or by an operator of system 10. Alternatively, addressing device 18 may be a CMOS latch or register that has the relevant PROM addresses loaded into it upon boot-up of system 10.

An optional feature is an external storage device 20 coupled to FPGA 12. External storage device 20 stores the state of logic functions as well as any other needed input states from one reconfiguration cycle to the next while FPGA 12 is in a reconfiguration mode, as described in further detail below.

Figure 3:
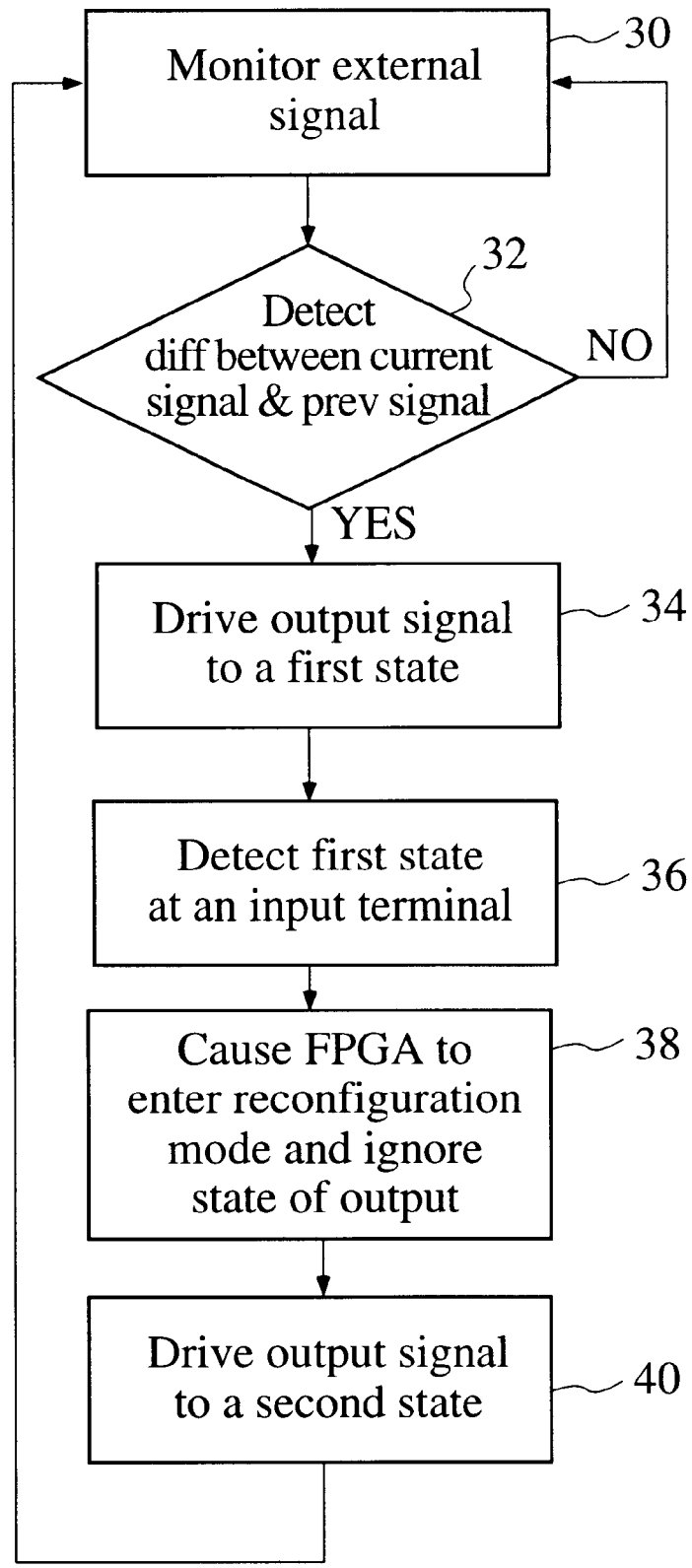
FIG. 3 is a flow chart illustrating a self-reconfiguration method of the present invention.

Referring next to FIG. 3, a method 28 of self-reconfiguration using the system of FIG. 2 is illustrated. The method begins at step 30 with FPGA 12 in a normal operation mode, monitoring external signals sent from addressing device 18 to PROM 14. The monitoring circuit is preferably implemented in FPGA 12 (either programmably or hard-wired), as shown in FIG. 2; however, in one embodiment the circuit is implemented externally to the FPGA. The implementation of such a monitoring circuit is straightforward to those of ordinary skill in the art of logic design. If FPGA 12, at step 32, does not detect a difference between a characteristic of the signal currently being monitored and a characteristic of a previously monitored signal, FPGA 12 continues to monitor signals sent from addressing device 18 to PROM 14. However, if FPGA 12 detects a difference between a characteristic of the signal currently being monitored and a characteristic of a previously monitored signal, at step 34 FPGA 12 drives output terminal 11 into a first, programming state.

It should be noted that the characteristic of a signal sent from addressing device 18 to PROM 14 changes in a manner dependent on the type of addressing device 18 present in the system. For example, if addressing device 18 is a binary or rotary switch, the characteristic of the signal changes when the operator of the system actuates the switch. Alternatively, if addressing device 18 is a CMOS latch or register, the characteristic of the signal changes when the CMOS latch or register points to a new address in PROM 14.

At step 36, nearly simultaneous with step 34, the PROGRAM input terminal 13 of FPGA 12 is driven into the first state by the signal on output terminal 11 of FPGA 12. This step, in turn, causes FPGA 12 to enter a reconfiguration mode at step 38, which causes the signal received from output terminal 11 to be ignored. Therefore, the method of the invention is reliably stable and does not undesirably repeat, oscillate, or fail.

Alternatively, to provide continuity of data processed from one reconfiguration cycle to another, immediately before the state of the signal on output terminal 11 is changed and reconfiguration commences, FPGA 12 can load the state of internal logic functions, as well as any other later-needed signal states, into external storage device 20.

Next, FPGA 12 downloads a configuration from a source location in PROM 14 addressed by addressing device 18 and the incremental addresses provided by FPGA 12. If information was stored in external storage device 20, after FPGA 12 has configured itself in accordance with the newly downloaded configuration, the stored information is preferably returned to the FPGA. Finally, at step 40, FPGA 12 drives the signal on output terminal 11 into a second state, preferably returning the signal to its original state. Thus, the signal on output terminal 11 returns to its original state almost immediately after initiating the reconfiguration of FPGA 12.

The present invention therefore provides a novel self-reconfiguration system and scheme. Although the present invention has been shown and described with respect to preferred embodiments, various changes and modifications lie within the spirit and scope of the claimed invention. The corresponding structures, materials, acts, and equivalents of all means or step plus function elements in the claims are intended to include any structure, material, or acts for performing the functions in combination with other elements as specifically claimed.

What is claimed is:

1. A self-reprogrammable system, comprising:
an input terminal;
an output terminal in electrical communication with the input terminal;
output control means, responsive to a reconfiguration request signal, for driving a signal on the output terminal into a first state and causing the system to enter a reconfiguration mode in response to detection of the first state on the input terminal;
a monitoring circuit for detecting a monitored characteristic of an external signal, the monitoring circuit including means for generating the reconfiguration request signal in response to detection of a change in the monitored characteristic of the external signal.

2. The system of claim 1, wherein the output control means drives the signal on the output terminal into a second state during the reconfiguration mode.

3. The system of claim 2, wherein the self-reprogrammable system enters an operating mode in response to detection of the second state on the input terminal.

4. The system of claim 1, wherein the self-reprogrammable system is a Field Programmable Gate Array (FPGA).

5. The system of claim 4, wherein the input terminal is a PROGRAM input terminal of the FPGA.

6. The system of claim 1, wherein the external signal is an address input signal of a memory device, the memory device having a plurality of system configurations stored thereon.

7. The system of claim 6, wherein the monitored characteristic of the external signal is an address denoted by the external signal.

8. The system of claim 6, wherein the self-reprogrammable system loads one of the plurality of configurations from the memory device when the system is in the reconfiguration mode.

9. The system of claim 6, wherein the monitoring circuit is included in each of the plurality of system configurations stored on the memory device.

10. The system of claim 1, wherein the external signal is generated by a binary switch and the monitored characteristic of the external signal changes in response to actuation of the binary switch.

11. A method of self-reconfiguration of a reprogrammable device, the method comprising the steps of:

monitoring an external signal;

determining whether there is a difference between a detected characteristic of the external signal at a first and a second time;

driving a signal on an output terminal of the reprogrammable device into a first state in response to a determination that there is a difference in the detected characteristic at the first and the second time;

detecting the first state of the signal on the output terminal at an input terminal of the reprogrammable device; and causing the reprogrammable device to enter a reconfiguration mode in response to detection of the first state.

12. The method of claim 11, further comprising the steps of:

driving the signal on the output terminal of the reprogrammable device into a second state upon configuration.

13. The method of claim 12, further comprising the steps of:

detecting the second state of the signal on the output terminal at the input terminal of the reprogrammable device; and causing the reprogrammable device to enter an operating mode in response to detection of the second state.

14. The method of claim 11, wherein the reprogrammable device is a Field Programmable Gate Array (FPGA).

15. The method of claim 14, wherein the input terminal is a PROGRAM input terminal of the FPGA.

16. The method of claim 11, wherein the external signal is an addressing signal for an external memory device, the external memory device having a plurality of configurations stored thereon.

17. The method of claim 16, wherein the characteristic of the external signal is the address carried by the external signal.

18. The method of claim 16, further comprising the steps of:

loading one of the configurations from the external memory device into the reprogrammable device when the reprogrammable device is in the reconfiguration mode.

19. The method of claim 16, wherein the external memory is a Programmable Read Only Memory (PROM).

20. The method of claim 11, wherein the external signal is generated by a binary switch and the detected characteristic of the external signal changes in response to actuation of the binary switch.

21. A system for causing self-reconfiguration in a programmable device, the system comprising:

means for monitoring an external signal;

means for determining whether there is a difference between a detected characteristic of the external signal at a first and a second time;

means for driving a signal on an output terminal of the programmable device into a first state in response to a determination that there is a difference in the detected characteristic at the first and the second time;

means for detecting the first state of the signal on the output terminal at an input terminal of the programmable device; and means for causing the programmable device to enter a reconfiguration mode in response to detection of the first state.

22. The system of claim 21, further comprising:

means for driving the signal on the output terminal of the programmable device into a second state upon reconfiguration.

23. The system of claim 22, further comprising:

means for detecting the second state of the signal on the output terminal at the input terminal of the programmable device; and means for causing the programmable device to enter an operating mode in response to detection of the second state.

24. The system of claim 21, wherein the programmable device is a Field Programmable Gate Array (FPGA).

25. The system of claim 24, wherein the input terminal is a PROGRAM input terminal of the FPGA.

26. The system of claim 24, wherein the means for monitoring is included in a configuration implemented in the FPGA.

27. The system of claim 21, wherein the external signal is a signal being transmitted to an address input of an external memory device, the external memory device having a plurality of configurations stored thereon.

28. The system of claim 27, wherein the characteristic of the external signal is the address carried by the external signal.

29. The system of claim 27, further comprising:

means for loading one of the plurality of configurations from the external memory device into the programmable device when the programmable device is in the reconfiguration mode.

30. The system of claim 27, wherein the external memory is a Programmable Read Only Memory (PROM).

31. The system of claim 27, wherein the means for monitoring is in each of the plurality of configurations stored in the memory device.

32. The system of claim 21, wherein the external signal is generated by a binary switch and the detected characteristic of the external signal changes in response to actuation of the binary switch.

* * * * *